Sept. 29, 1959 D. C. ROCKOLA 2,906,538
PHONOGRAPHS
Original Filed Nov. 16, 1953 9 Sheets-Sheet 1

Inventor:
DAVID C. ROCKOLA
By Horton, Davis,
Brewer and Brugman
Attorneys.

Sept. 29, 1959     D. C. ROCKOLA     2,906,538
PHONOGRAPHS
Original Filed Nov. 16, 1953     9 Sheets-Sheet 2
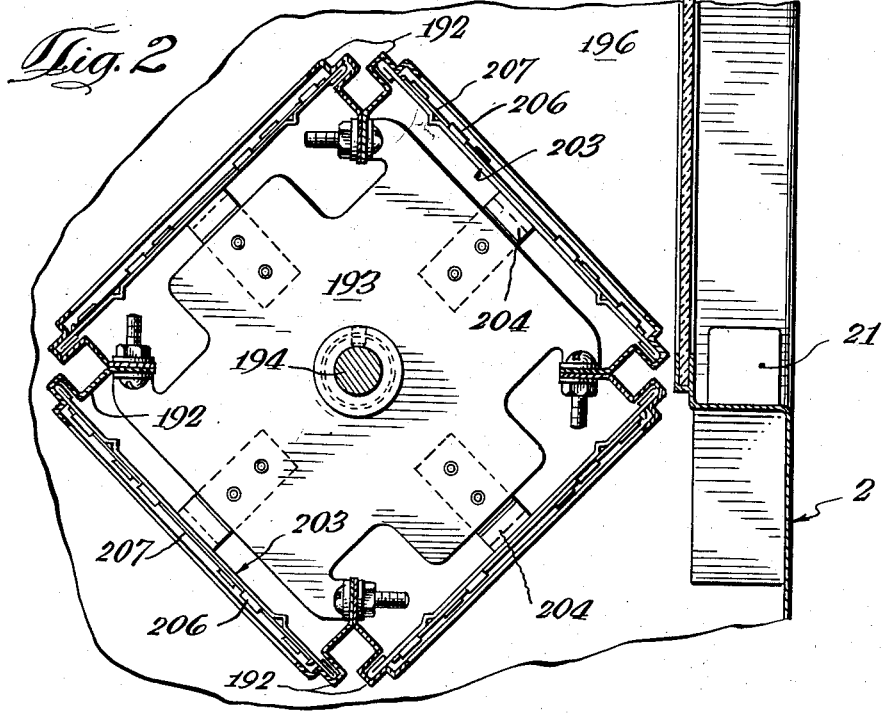
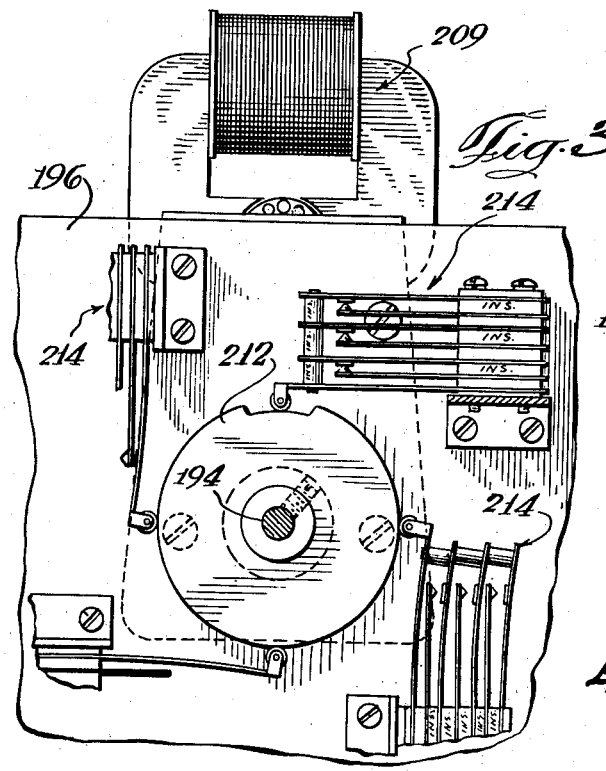
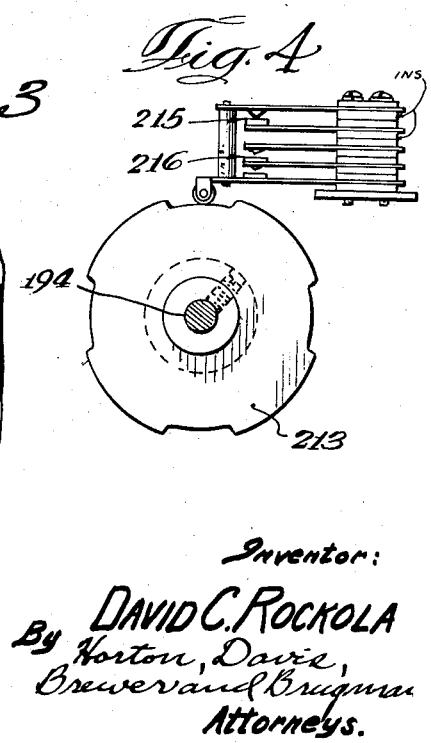

Sept. 29, 1959   D. C. ROCKOLA   2,906,538
PHONOGRAPHS
Original Filed Nov. 16, 1953   9 Sheets-Sheet 3
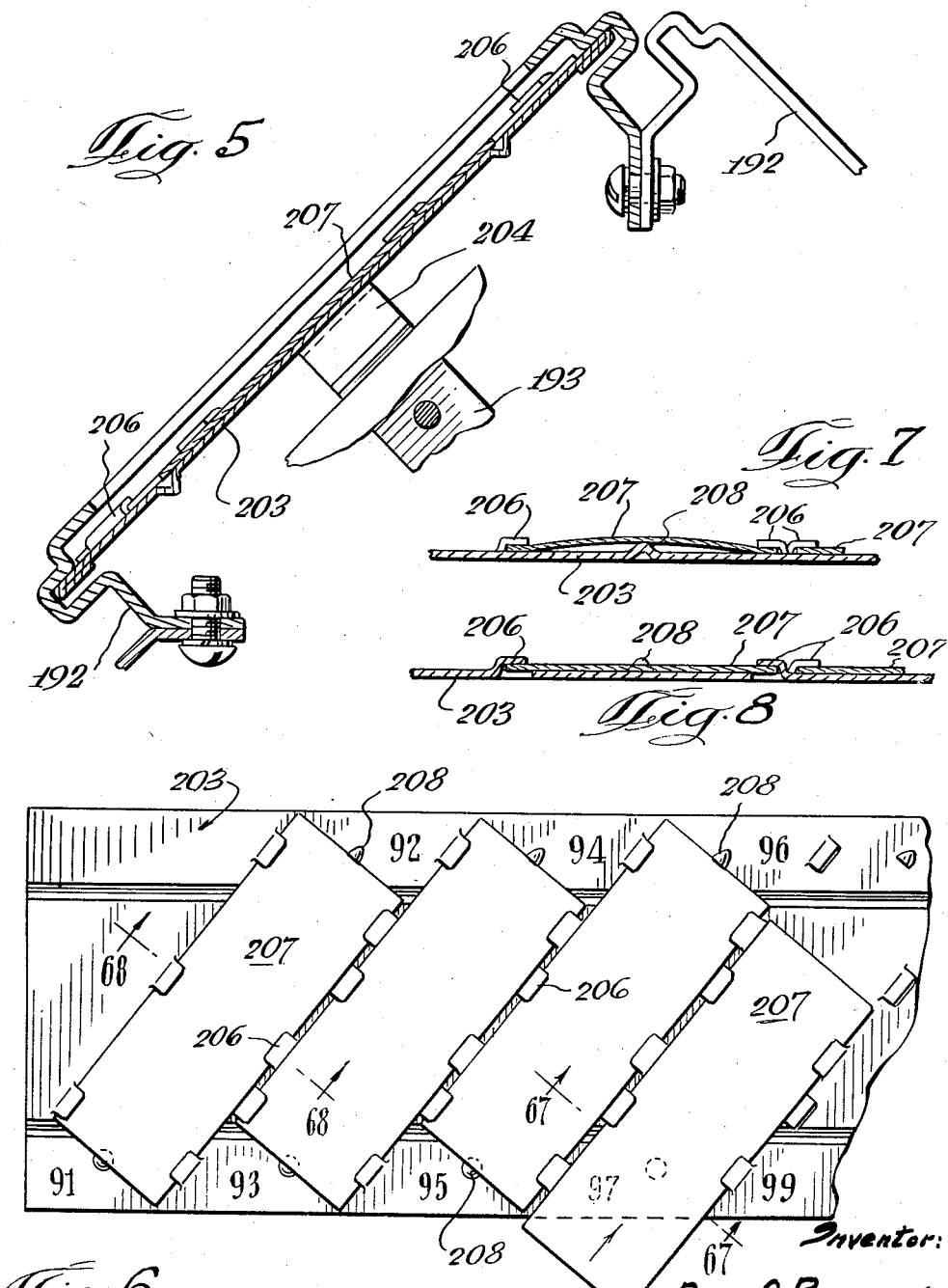

Sept. 29, 1959 D. C. ROCKOLA 2,906,538
PHONOGRAPHS
Original Filed Nov. 16, 1953 9 Sheets-Sheet 4
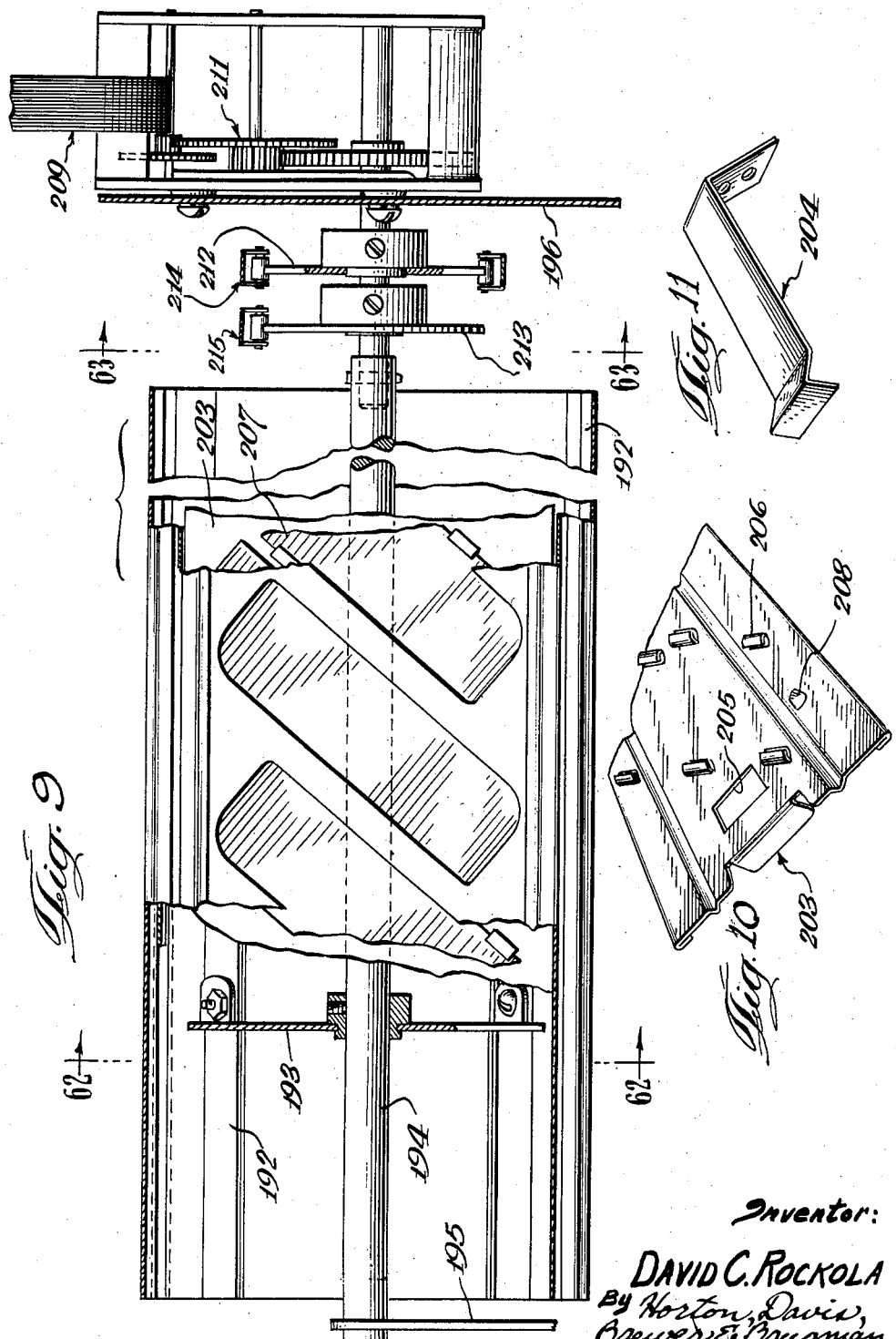
Inventor:
DAVID C. ROCKOLA
By Horton, Davis,
Brewer & Bregman
Attorneys.

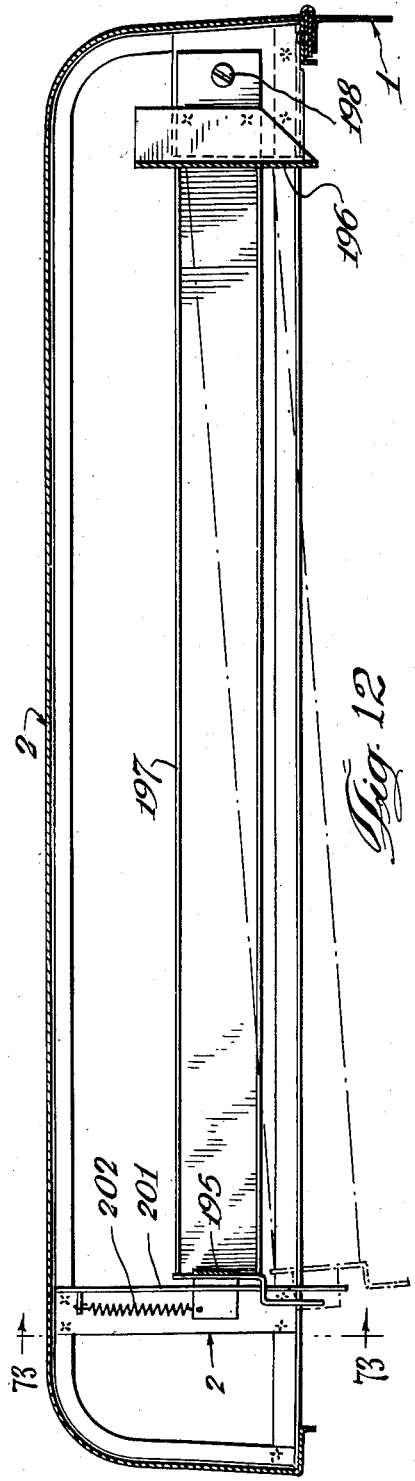

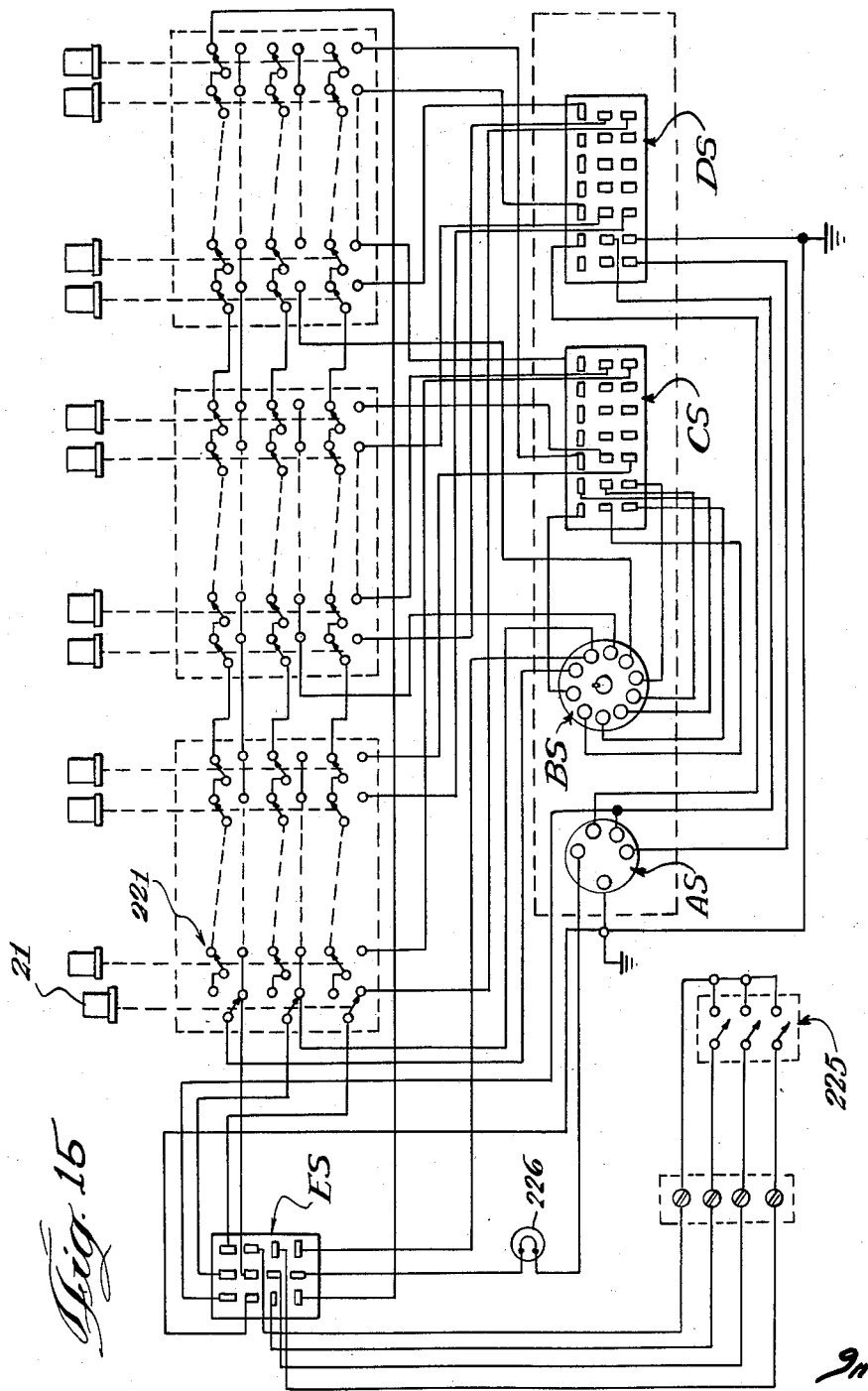

Sept. 29, 1959   D. C. ROCKOLA   2,906,538
PHONOGRAPHS
Original Filed Nov. 16, 1953   9 Sheets-Sheet 7

Inventor:
DAVID C. ROCKOLA
By Horton, Davis, Brewer and Brugman
Attorneys.

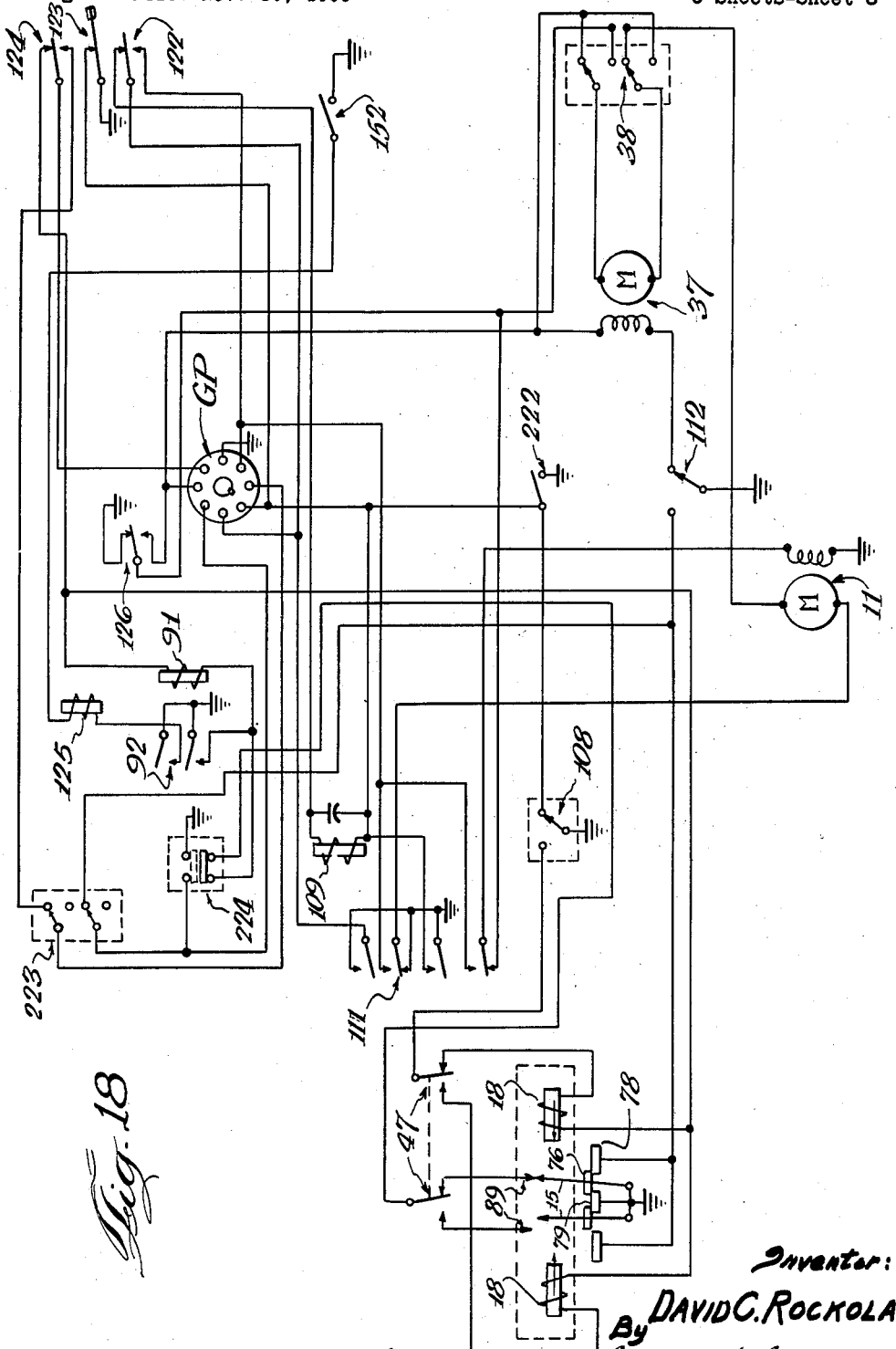

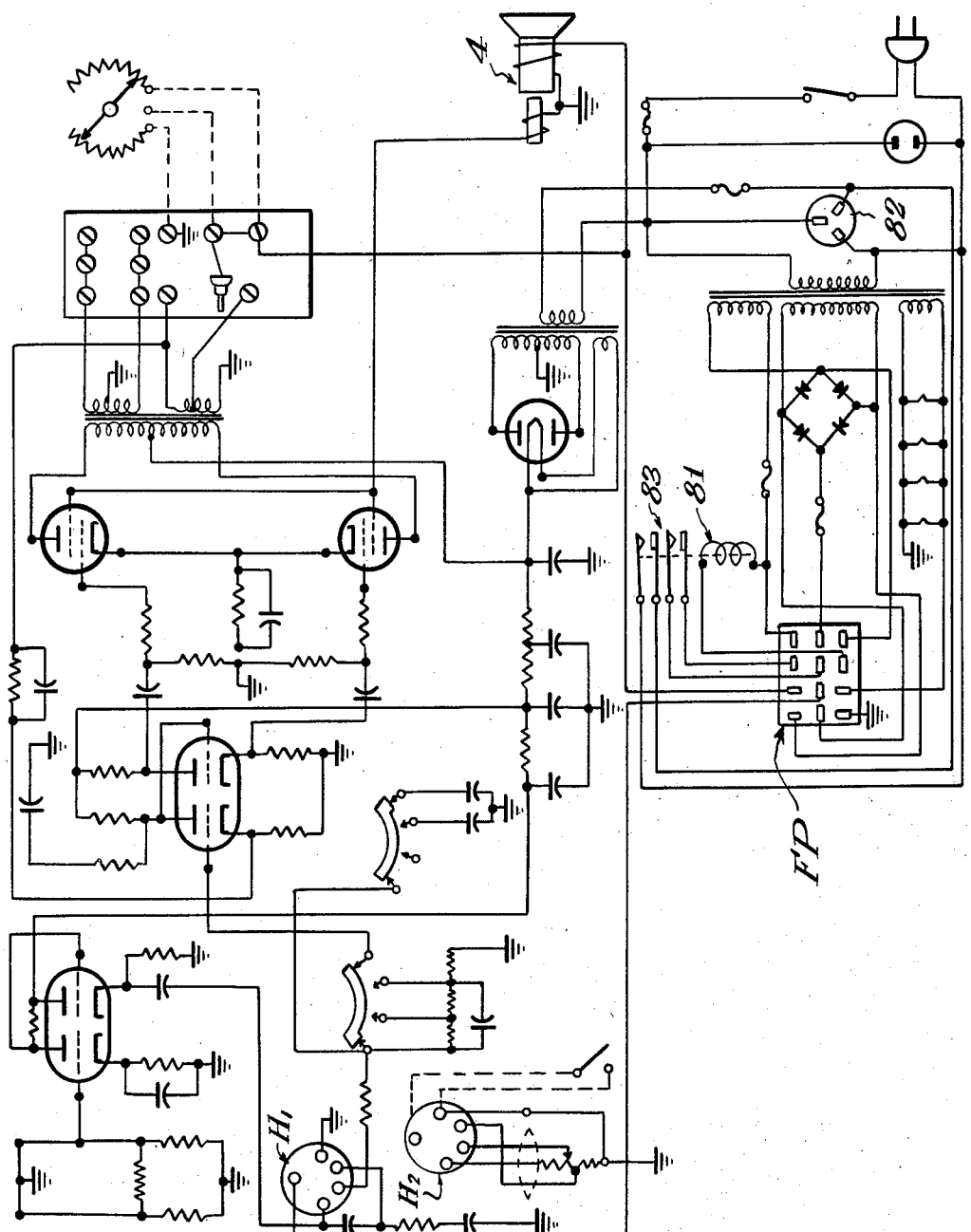

United States Patent Office 2,906,538
Patented Sept. 29, 1959

2,906,538

PHONOGRAPHS

David C. Rockola, Chicago, Ill., assignor to Rock-Ola Manufacturing Corporation, Chicago, Ill., a corporation of Delaware Original application November 16, 1953, Serial No. 392,446, now Patent No. 2,804,307, dated August 27, 1957. Divided and this application December 13, 1956, Serial No. 628,123

2 Claims. (Cl. 274—10)

This invention relates in general to phonographs, and more particularly to automatic, coin controlled, multi-record phonographs capable of storing a large number of disc records and selectively playing either or both sound recordings on the obverse and reverse sides of one, some, or all of them, as more fully illustrated and described in my co-pending application for United States Letters Patent, Serial No. 392,446, filed November 16, 1953, now U.S. Patent No. 2,804,307, of which this application is a division.

A principal object of the invention is to reduce the floor space requirements of such a phonograph to a minimum, while maintaining the highest possible sound fidelity and giving easier access to the operating mechanism for servicing and substitution of records. The manner in which this has been accomplished will more clearly appear from the following disclosure, and it will be seen that no appreciably greater space is required for the instant embodiment which affords 120 selections than for older mechanisms offering only 20 selections.

A further object of the invention is to enable "file tray" programming for easier selecting and faster servicing by providing a novel selectively operable program holder which visually cooperates with manually operable selector buttons or keys and includes a separate tray for each desired selection grouping or classification which is quickly removable by the service man to change desired selection identifying indices carried thereby.

Numerous other objects and advantages of the invention will be apparent as it is better understood from the following description, which, when taken in connection with the accompanying drawings, discloses a preferred embodiment thereof.

In the drawings:

Figure 1 is a perspective view of an automatic phonograph embodying the features of the instant invention, showing the front door swung to an open position;

Figs. 2 and 3 are enlarged vertical sections through the program holder on lines 62—62 and 63—63 of Fig. 9;

Fig. 4 is a detail elevation of the start relay follow switch;

Fig. 5 is an enlarged fragmentary section on line 62—62 of Fig. 9;

Fig. 6 is a plan of a portion of one of the program holder slides;

Figs. 7 and 8 are detail sections on lines 67—67 and 68—68 of Fig. 6;

Fig. 9 is an enlarged rear elevation of the program holder with parts broken away;

Fig. 10 is a perspective view of an end portion of a program holder slide;

Fig. 11 is a perspective of a slide retaining latch;

Fig. 12 is a horizontal section through the front door of the machine below the program holder;

Fig. 13 is a detail vertical section on line 73—73 of Fig. 12;

Fig. 14 is a detail front elevation of a portion of the selector button assembly on the door of the machine; and Figs. 15 through 19 are wiring diagrams of the control circuits of the machine.

Figure 1:
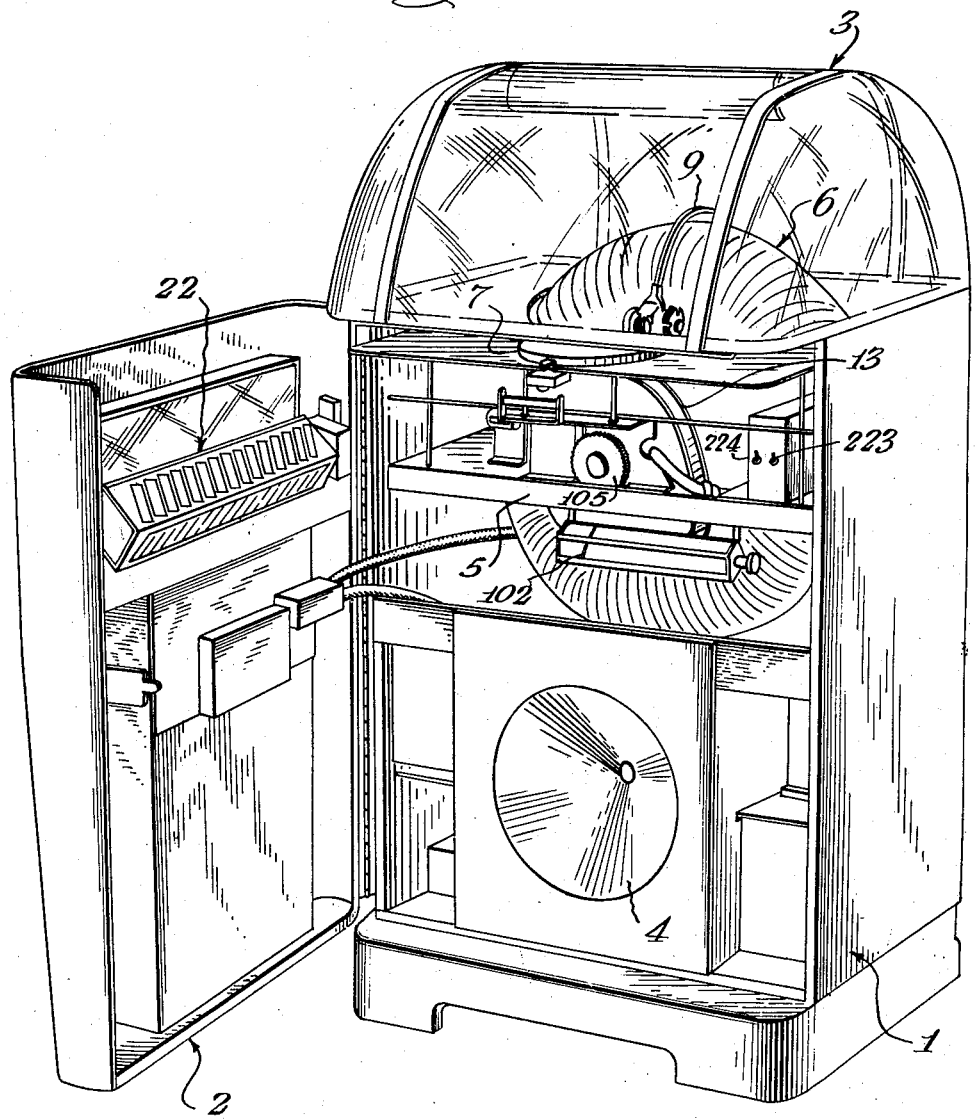
Figure 16:
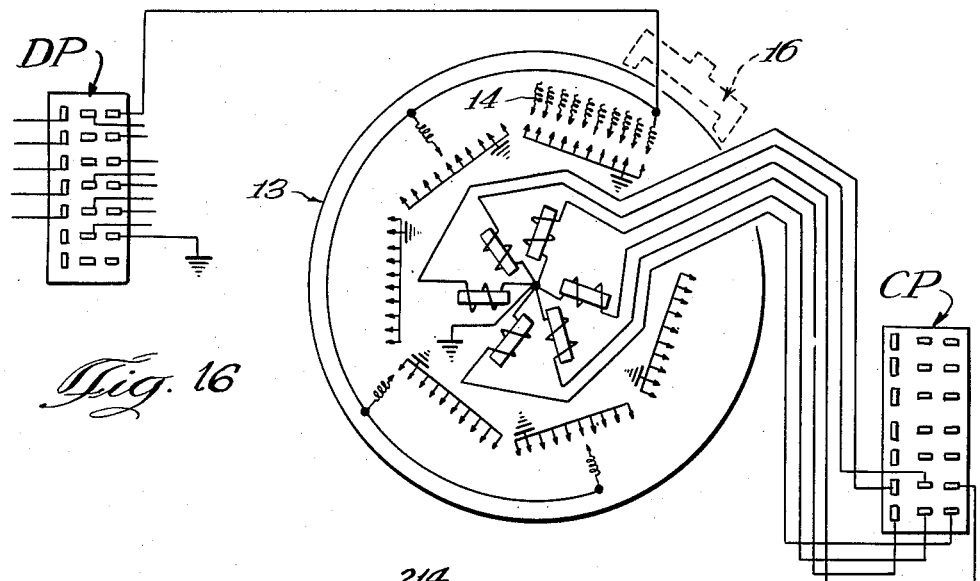

Referring more particularly to Figure 1, an automatic phonograph embodying the instant invention is therein generally disclosed as incorporated within a suitable casing 1 having a front door 2, a rear door (not shown), and a rearwardly swingable dome-type cover 3 to give ready access to the operating mechanism. Within the lower portion of the casing 1 is mounted the amplifier system for the phonograph, including a speaker 4. The operating mechanism is disposed above the latter and supported by a frame 5 mounted in any suitable manner within the casing. The operating mechanism includes a drum-type record magazine 6, a turntable 7, a tone arm (not shown), and record delivery mechanism for transferring records between the magazine 6 and turntable 7 which comprises a gripper arm 9 driven by a gripper motor 11 (Fig. 18). Co-axially mounted with the magazine drum 6 is a selector unit assembly comprising a stationary coil bank or drum 13 housing a plurality of selector coils 14 (Fig. 16) and selector levers 15 (Fig. 18). This selector unit assembly also includes a selector carriage 16 (Fig. 16) which is mounted for rotation around the periphery of selector drum 13 by the magazine 6. The selector carriage 16 includes a pair of selector lever cancel solenoids 18 (Fig. 18).

Initiation of operation of this mechanism may be effected at the machine or at a remotely located control unit by deposit of a coin and operation of a selector button, such as the buttons 21 (Figs. 14 and 15) which are mounted on the exterior of the front door 2 forwardly of a program holder 22 (Fig. 1). A remote control unit which may be employed with the instant machine is that disclosed in my co-pending application Serial No. 392,-265, filed November 16, 1953. Deposit of a proper coin or coins operates a suitable accumulator, such as that disclosed in U.S. Letters Patent No. 2,613,791, issued October 14, 1952, and application Serial No. 196,663, filed November 20, 1950, and conditions the selectively operable manual push buttons 21 for effective actuation. Such actuation of an operative selector button 21 momentarily energizes a selector coil 14 and a credit is removed from the accumulator. The momentarily energized coil 14 moves its associated selection lever 15 to an outer or play position which closes a circuit to a start relay in the amplifier, thereby turning on the latter, and suitable turntable and magazine motors. The latter is designated by reference numeral 37 in Fig. 18 and revolves the magazine 6 and selector carriage 16 clockwise or counterclockwise, depending upon the position of a magazine reversing switch 38, the carriage 16 moving over the several selection levers 15 which radiate out of the coil bank drum 13. In the instant modification there are 120 levers 15, one for each record side, arranged radially of their supporting drum in two parallel rows of 60 levers each. The levers for playing the even numbered selections are in a row toward the rear of the machine and the selection sequence is such that even numbers are selected from 2 to 120 and odd numbers from 119 to 1. Each selector lever 15 is suitably shouldered to carry a contact plate 76 (Fig. 18). Adjacent each row of levers 15 is an outer contact ring 78, and a common contact ring 79 is disposed between the rows of levers 15. When energization of a coil 14 moves its lever 15 to the outer or play position, the associated contact plate 76 bridges the contact rings 78 and 79, as shown by the right-hand lever 15 in Fig. 18, which causes a start coil 81 to be energized to turn on the amplifier, turntable motor (through socket 82 of Fig. 19), and magazine motor 37 by the resulting closing of start relay contacts 83.

The carriage 16, which is revolved around the drum 13 by the magazine 6, as previously noted, carries opposed switch contacts 89 (Fig. 18) for engaging the operated levers 15. A double track switch 47 is disposed in one of two possible positions in accordance with the direction of rotation of the magazine 6, so that first the operated levers 15 in one row will be effective serially, and thereafter those in the other row. As soon as movement of carriage 16 causes engagement of contacts 89 with an operated lever 15 in that row associated with the then active position of track switch 47, a circuit to an interlock relay trip coil 91 (Fig. 18) is closed to reposition its contacts 92, which stops the magazine motor 37 and closes a circuit to the gripper motor 11 to initiate delivery of the selected record from the magazine 6 to the turntable 7. As the record is placed on the turntable, a cancel relay micro follow switch 108 (Fig. 18) is moved to close a circuit to the proper carriage selector lever cancel solenoid 18 to return the lever 15 that stopped magazine movement to its normally inoperative position. After the selected record has been played, this switch 108 is returned to its position of Fig. 18 to complete a secondary circuit to a coil 109 of a cancel relay having contacts 111, which prevents the relay from unlocking in the event that the main power fails momentarily for any reason. A start relay micro follow switch 112 is actuated after the described indexing of the magazine 6 to disconnect the field of magazine motor 37 and connect a holding circuit to the start relay 81 also illustrated in Fig. 18 is a snap-type, multi-pole limit switch having three segments or sets of contacts 122, 123 and 124. In the normal rest or inoperative position of the machine, the set of contacts 122 completes a circuit to the interlock trip coil 91 to allow indexing by the carriage contacts 89 when they strike a registered selection lever 15, the second set of contacts 123 mutes the amplifier output, and the third set 124 completes circuits to the magazine and grip motors 37 and 11. As a selected record is deposited on the turntable, these three sets of contacts are repositioned, which causes the first set 122 to open the circuit to the selection lever cancel solenoids 18 and condition the cancel relay circuit for later use. The second set of contacts 123 when so repositioned opens the amplifier muting circuit, and the third set 124 opens the two power motor circuits and closes a circuit to a release coil 125 (Fig. 18) of the interlock relay, thus releasing the interlock to its original position.

At the completion of the playing of the record which was selected and placed on the turntable, a tone arm micro switch 152 (Fig. 18) is closed, which closes a circuit to the cancel relay coil, the contacts of which close a circuit to the grip motor 11 in such manner that its direction of rotation is reversed, whereby the jaws of gripper arm 9 engage the record and return the same from the turntable 7 to its proper position in the magazine 6. As the grip jaws begin to release the record the inner micro switch is again operated to break the circuit to the stop relay and cause it to relax providing no additional selections are registered in the accumulator. This breaks the circuits to the turntable motor and amplifier, causing them to become inoperative. After the grip jaws have released the record, the grip cam limit switch snaps to its original position and opens the cancel relay circuit. In turn, this opens the circuit to the gripper motor 11 and shorts its armature, causing the motor to stop. The machine cycle thereby is completed with all of the parts being returned to normal condition.

To enable an operator to select one or more of the records available for playing with the greatest ease and speed and minimum effort, and at the same time to facilitate changing of selection identifying indices by a service man, the novel program holder 22 is provided which cooperates with the selector buttons 21 and the machine control and operating means and constitutes the primary subject matter of this divisional application. The program holder 22 and associated mechanism which is mounted behind a window in the front door 2 of the casing (Fig. 1) is more specifically illustrated in Figs. 2–14. The holder proper comprises, in the present embodiment, a four-sided tubular frame made up of transverse members 192 bolted together (Fig. 2) and secured to the corner portions of hub plates 193 which are mounted on a supporting shaft 194. The ends of shaft 194 are rotatably supported by end plates 195 and 196 (Fig. 9) which are secured at their lower ends to a transverse bottom plate 197, the one end of which (right end in Fig. 12) is mounted on a vertical pivot 198 on the frame of the door 2. The lower end of the left end plate 195 extends outwardly through a stepped horizontal slot 199 (Fig. 13) in a door frame rail 201 and is resiliently held in its forward position by a coil spring 202. With this arrangement, the left end of the program holder, viewing Figs. 1 and 12 may be swung rearwardly about pivot 198 and against spring 202 and latched in an outer position (broken lines in Figs. 12 and 13) to clear the side wall of the casing door for program changing purposes.

Each transverse frame member 192 is formed, as best seen in Fig. 5, to slidably receive an elongated display panel or program strip 203, with leaf springs 204 (Fig. 11), which are mounted on the hub frame members 193, pressing outwardly against the strips 203 to hold the same removably in place. The spring latches 204 at the left end of the frame engage in apertures 205 (Fig. 10) in the strips 203. Any strip 203 thus may be slid endwise out of the holder frame when the latter is moved to its broken line position of Fig. 12. Each strip 203 is provided with a plurality of up-struck tabs 206 (Figs. 6–8) in angularly disposed and parallel rows to receive and retain paper slips 207 in oblique echelon relationship to each other. Raised slip end-holding tabs 208 are also provided, over which the slips 207 may be slid in removing and inserting them. Each slip 207 contains identifying indicia for two recordings, and the arrangement in such, as seen in Fig. 6, that odd selection numbers on the bottom and even selection numbers on the top marginal portions of the strip 203 are aligned with the proper indices and separated by the corner portions thereof. These indices on each strip 203 also are visually aligned with their respective push buttons or manual selector keys 21 on the front of the door 2 when the holder 22 is in its operative position of Fig. 1 and that strip 203 is visible from the front of the door (from the right side of Fig. 2). Such arrangement is also illustrated in Fig. 14 to better show the visual alignment of each key 21, its identifying number on the strip 203 and its identifying indicia on the associated slip 207.

Figure 17:
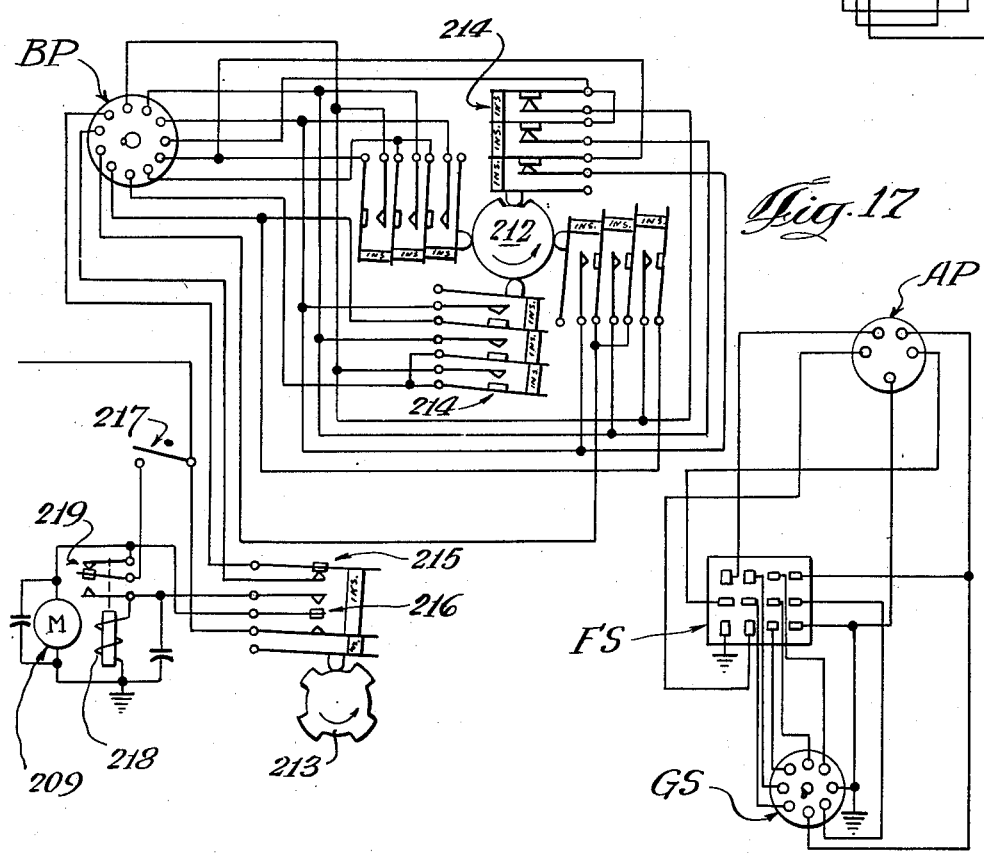

Mounted on the right end plate 196 (Figs. 3 and 9) is a program drive motor 209 which is connected by means of a gear train 211 to drive the shaft 194. Mounted on shaft 204 are two program cams 212 and 213. As shown in Fig. 3, cam 212 has a single dwell which permits opening of any one of four multi-contact program transfer switches 214 mounted on the frame plate 196 which are normally held open by the cam. As shown in Fig. 4, cam 213 has four dwells for permitting closing of one pair of contacts 215 and opening of another set of contacts 216. The circuits for these several parts are shown in Fig. 17 in connection with a manually operable program change switch 217, change coil 218 and switch 219 operated thereby. This arrangement results in operation of motor 209 when manual switch 217 is closed to rotate the program holder 22 to bring the next strip 203 into proper registration with selector buttons 21. As shaft 194 is rotated, a high point on cam 213 opens switch 215 to cut out the selector switches 221 (Fig. 15) operable by push buttons 21, and closes switch 216 to continue cyclic operation of motor 209 and render manual switch 217 inoperative by closing the circuit to coil 218 which changes the position of switch 219. At the same time, the formerly closed set of program transfer switches 214 are opened by cam 212. When the next strip 203 comes into proper position, the next dwell in cam 213 stops the motor 209 and returns the parts to normal, as in Fig. 17, and the dwell of cam 212 permits the next set of switches 214 associated therewith to close. These switches 214 correspond in function to the page switches 83 and 84 of my co-pending application Serial No. 392,265, filed November 16, 1953. For convenience of operation and servicing, a manual selection cancel switch 222, main service switch 223 and record loading switch 224 also are arranged in the machine circuit, as shown in Fig. 18. A bank of coin operated switches 225 are shown in Fig. 15 which cause actuation of the accumulator, and this view also illustrates the "make selection light" 226.

Reference has been made from time to time to various of the figures illustrating the machine circuits. In view of the complexity of these circuits, it has been found necessary to employ several sets of drawings for their different portions. The circuits illustrated in Figs. 15 through 19 are electrically interconnected in the following manner. The sockets AS and BS in Fig. 15 are connected to the plugs AP and BP in Fig. 17. The sockets CS and DS of Fig. 15 are connected to the plugs CP and DP of Fig. 16. The socket ES of Fig. 15 is connected to the coin actuated accumulator unit. The socket FS of Fig. 17 is connected to the plug FP of Fig. 19, and the socket GS of Fig. 17 is connected to the plug GP of Fig. 18.

It will be apparent from the foregoing that only one of the several groups of selection identifying indices, each of which groups comprises those carried by one of the strips 203, will be operatively associated at any one time with the single bank of selector buttons 21, that cam 212 renders inoperative those groups of program switches 214 associated with all of the other groups of selection identifying indices and permits closing of that group of program switches 214 associated with the visible and operative group of selection identifying indices only when the program holder is stationary and in position to present the visible indices in physical alignment with the selector buttons 21, and that cam 213 renders the selector buttons 21 ineffective by opening switch 215 during selective rotation of the program holder. Thus, after the requisite coin deposit, an operator may effect selection of a particular recording simply by depressing that button 21 which is aligned with the indicia identifying that one recording. If a different group of indices are presented in visual and operative position, depression of the same button 21 will effect selection of a different recording, namely, that identified by the different indicia then aligned therewith. And for the convenience of the service man, the above-described mounting of the program holder makes accurate changing of the identifying indicia carrying slips 207 the most simple operation possible.

It is thought that the invention and its attendant advantages will be understood from the foregoing description, and it will be apparent that various changes may be made in the form, construction and arrangement of the parts without departing from the spirit and scope of the invention or sacrificing all of its material advantages, the forms hereinbefore described and illustrated in the drawings being merely preferred embodiments thereof.

I claim:

1. A program holder for an automatic phonograph, comprising a multi-sided frame, an identifying indicia bearing strip mounted on each side of said frame for longitudinal sliding movement relative thereto, a shaft for rotatably supporting said frame extending longitudinally thereof, means adjacent one end of said frame for supporting the same for movement on a pivotal axis perpendicular to the axis of said shaft, and means for supporting the other end of said frame for sliding movement perpendicular to said pivotal axis to enable the said other end of said frame to be swung from an operative to an inoperative position about said pivotal axis to facilitate sliding removal of said strips from said other end of said frame.

2. In a program holder according to claim 1, means for resiliently constraining said other end of said frame for movement on said pivotal axis in one direction to said operative position, and means for releasably latching said other end of said frame in said inoperative position against the action of said constraining means.

References Cited in the file of this patent

UNITED STATES PATENTS

| | | |
|---|---|---|
| 2,443,925 | Osborne | June 22, 1948 |
| 2,551,522 | Andres | May 1, 1951 |
| 2,553,160 | Arps | May 15, 1951 |
| 2,580,046 | Rockola | Dec. 25, 1951 |
| 2,612,710 | Fuller | Oct. 7, 1952 |